US009612713B2

(12) United States Patent
Kuscher et al.

(10) Patent No.: US 9,612,713 B2
(45) Date of Patent: Apr. 4, 2017

(54) INTELLIGENT WINDOW MANAGEMENT

(71) Applicant: Google Inc., Mountain View, CA (US)

(72) Inventors: Alexander Friedrich Kuscher, San Francisco, CA (US); John Nicholas Jitkoff, Palo Alto, CA (US)

(73) Assignee: Google Inc., Mountain View, CA (US)

( * ) Notice: Subject to any disclaimer, the term of this patent is extended or adjusted under 35 U.S.C. 154(b) by 219 days.

(21) Appl. No.: 13/627,927

(22) Filed: Sep. 26, 2012

(65) Prior Publication Data

US 2015/0199093 A1 Jul. 16, 2015

(51) Int. Cl.
*G06F 3/0481* (2013.01)
*G06F 3/0486* (2013.01)

(52) U.S. Cl.
CPC ........ *G06F 3/04812* (2013.01); *G06F 3/0486* (2013.01); *G06F 2203/04806* (2013.01)

(58) Field of Classification Search
CPC .................................................... G06F 3/0481
USPC ......................................................... 715/798
See application file for complete search history.

(56) References Cited

U.S. PATENT DOCUMENTS

| 5,347,295 | A | * | 9/1994 | Agulnick et al. | ............. 345/156 |
| 5,487,143 | A | * | 1/1996 | Southgate | ............. G06F 3/0481 715/790 |
| 5,956,032 | A | * | 9/1999 | Argiolas | ............... G06F 3/0481 715/798 |
| 6,008,809 | A | * | 12/1999 | Brooks | ................. G06F 3/0481 715/792 |
| 6,262,724 | B1 | * | 7/2001 | Crow | ...................... G06F 3/048 715/723 |
| 6,271,838 | B1 | * | 8/2001 | Gentner | ................ G06F 9/4443 715/788 |
| 8,356,258 | B2 | * | 1/2013 | Matthews | ............. G06F 3/0481 345/684 |
| 8,549,429 | B2 | * | 10/2013 | Tsuruta | ................. G06F 3/0481 715/767 |
| 2002/0191028 | A1 | * | 12/2002 | Senechalle | ............... G09G 5/14 715/800 |
| 2003/0020671 | A1 | * | 1/2003 | Santoro | ................. G06F 3/0481 345/1.3 |
| 2004/0066407 | A1 | * | 4/2004 | Regan et al. | .................. 345/764 |
| 2004/0174396 | A1 | * | 9/2004 | Jobs et al. | ..................... 345/810 |
| 2006/0095863 | A1 | * | 5/2006 | Van Leeuwen | ....... G06F 3/0481 715/788 |
| 2006/0279628 | A1 | * | 12/2006 | Fleming | ............... G11B 27/034 348/143 |

(Continued)

*Primary Examiner* — Reza Nabi
*Assistant Examiner* — Daniel Rodriguez
(74) *Attorney, Agent, or Firm* — McDermott Will & Emery LLP (57) ABSTRACT

A computer-implemented method for managing the placement one or more windows, the method comprising, defining a grid for a desktop display area, wherein the grid comprises a plurality of grid contours that are regularly spaced within the desktop display area, receiving user input for placing a selected window into a new position within the desktop display area and associating one or more edges of the selected window with one or more of the plurality of grid contours. In certain aspects, the method further comprises steps for snapping the window to the grid based on the association between the one or more edges and the one or more of the plurality of grid contours. Systems and computer-readable media are also provided.

19 Claims, 10 Drawing Sheets

(56) References Cited

U.S. PATENT DOCUMENTS

| | | | |
|---|---|---|---|
| 2007/0064004 A1* | 3/2007 | Bonner | G06F 3/04883 345/442 |
| 2007/0074129 A1* | 3/2007 | Baumann | H04N 7/181 715/764 |
| 2007/0094698 A1* | 4/2007 | Bountour | H04N 7/181 725/132 |
| 2007/0222769 A1* | 9/2007 | Otsuka | G01C 21/3664 345/173 |
| 2008/0168364 A1* | 7/2008 | Miller | G06F 3/016 715/762 |
| 2009/0013282 A1* | 1/2009 | Mercer | G06F 3/0481 715/788 |
| 2009/0024956 A1* | 1/2009 | Kobayashi | G06F 3/0481 715/784 |
| 2009/0031248 A1* | 1/2009 | Kano | G06F 3/0486 715/790 |
| 2009/0115797 A1* | 5/2009 | Poupyrev | G06F 3/04845 345/619 |
| 2009/0132942 A1* | 5/2009 | Santoro | G06F 3/0481 715/765 |
| 2009/0150823 A1* | 6/2009 | Orr et al. | 715/788 |
| 2010/0107118 A1* | 4/2010 | Pearce | G06F 3/0481 715/799 |
| 2010/0192091 A1* | 7/2010 | Oishi | G06F 3/1423 715/799 |
| 2010/0218090 A1* | 8/2010 | Amit | G06F 17/211 715/247 |
| 2010/0313110 A1* | 12/2010 | Claridge | G06F 3/0481 715/212 |
| 2011/0099512 A1* | 4/2011 | Jeong | G06F 3/0481 715/790 |
| 2011/0197263 A1* | 8/2011 | Stinson, III | G06F 3/011 726/4 |
| 2012/0084717 A1* | 4/2012 | Yao et al. | 715/792 |
| 2012/0092346 A1* | 4/2012 | Ording et al. | 345/473 |
| 2012/0162092 A1* | 6/2012 | Pasquero | G06F 3/0236 345/173 |
| 2012/0244913 A1* | 9/2012 | Dobroth | G06F 3/0481 455/566 |
| 2012/0317470 A1* | 12/2012 | Dejean | G06K 9/00463 715/227 |
| 2013/0086508 A1* | 4/2013 | Oguz | G06F 3/0484 715/779 |
| 2013/0167073 A1* | 6/2013 | Ari | G06F 3/0481 715/798 |
| 2013/0227472 A1* | 8/2013 | Sosinski | G06F 3/0481 715/794 |
| 2013/0263042 A1* | 10/2013 | Buening | 715/783 |
| 2014/0208262 A1* | 7/2014 | Huang | G06F 3/0481 715/800 |
| 2014/0337793 A1* | 11/2014 | Han | G06F 3/0481 715/798 |
| 2014/0369527 A1* | 12/2014 | Baldwin | H03G 7/002 381/107 |

* cited by examiner

INTELLIGENT WINDOW MANAGEMENT

BACKGROUND

The subject technology relates to a user interface for managing windows and particularly, to a window manager for running and managing the display of one or more windows.

SUMMARY

The disclosed subject matter relates to a computer-implemented method for managing the placement of one or more windows, the method comprising, defining a grid for a desktop display area, wherein the grid comprises a plurality of grid contours that are regularly spaced within the desktop display area, receiving user input for placing a selected window into a new position within the desktop display area and associating one or more edges of the selected window with one or more of the plurality of grid contours. In certain aspects, the method further comprises a step for snapping the window to the grid based on the association between the one or more edges and the one or more of the plurality of grid contours.

The disclosed subject matter also relates to a system for managing the placement of one or more windows, the system comprising, one or more processors and a computer-readable medium comprising instructions stored therein, which when executed by the processors, cause the processors to perform operations comprising, defining a grid for a desktop display area, wherein the grid comprises a plurality of grid contours that are regularly spaced within the desktop display area, receiving user input for placing a selected window into a new position within the desktop display area and determining an affinity between the one or more edges of the selected window and the one or more of the plurality of grid contours. In certain aspects, the processors can be further configured to perform operations for associating one or more edges of the selected window with one or more of the plurality of grid contours based on the affinity and snapping the window to the grid based on the association between the one or more edges and the one or more of the plurality of grid contours.

In some implementations, the subject disclosure relates to a computer-readable medium comprising instructions stored thereon, which when executed by a processor, cause the processor to perform operations comprising, defining a grid for a desktop display area, wherein the grid comprises a plurality of grid contours that are regularly spaced within the desktop display area, receiving user input for placing a selected window into a new position within the desktop display area and determining an affinity between the one or more edges of the selected window and the one or more of the plurality of grid contours. In certain aspects, the processors are further configured to perform operations for associating one or more edges of the selected window with one or more of the plurality of grid contours based on the affinity and snapping the window to the grid based on the association between the one or more edges and the one or more of the plurality of grid contours.

In another implementation, the subject disclosure relates to a computer-implemented method for tiling a window, the method comprising, presenting a window of a first size, in a desktop display area, receiving, in the window, a first user input indicating a selection of the window, receiving, in the window, a second user input indicating a first movement of the window in the direction of a first edge of the desktop display area and in response to the second user input, tiling the window to a first predetermined size. In certain aspects, the method further comprises steps for receiving, in the window, a third user input indicating a second movement of the window in the direction of the first edge and in response to the third user input, tiling the window to a second predetermined size.

In another implementation, the subject disclosure relates to a system for tiling a window, the system comprising, one or more processors and a computer-readable medium comprising instructions stored therein, which when executed by the processors, cause the processors to perform operations comprising, presenting a window of a first size, in a desktop display area, receiving, in the window, a first user input indicating a selection of the window, receiving, in the window, a second user input indicating a first movement of the window in the direction of a first edge of the desktop display area and in response to the second user input, tiling the window to a first size. In certain aspects, the processors are further configured to perform operations for receiving, in the window, a third user input indicating a second movement of the window in the direction of the first edge, in response to the third user input, tiling the window to a second size, receiving, in the window, a fourth user input indicating a third movement of the window in the direction of the first edge and in response to the fourth user input, tiling the first window to a third size.

In yet another implementation, the subject disclosure relates to a computer-readable medium comprising instructions stored thereon, which when executed by a processor, cause the processor to perform operations comprising, presenting a window of a first size, in a desktop display area, receiving, in the window, a first user input indicating a selection of the window, receiving, in the window, a second user input indicating a first movement of the window in the direction of a first edge of the desktop display area and in response to the second user input, tiling the window to a first size. In certain aspects, the processors are further configured to perform operations for receiving, in the window, a third user input indicating a second movement of the window in the direction of the first edge and in response to the third user input, tiling the window to a second size.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative, and not restrictive in nature.

BRIEF DESCRIPTION OF THE DRAWINGS

Certain features of the subject technology are set forth in the appended claims. However, the accompanying drawings, which are included to provide further understanding, illustrate disclosed aspects and together with the description serve to explain the principles of the disclosed aspects. In the drawings:

DETAILED DESCRIPTION

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a more thorough understanding of the subject technology. However, it will be clear and apparent to those skilled in the art that the subject technology is not limited to the specific details set forth herein and may be practiced without these specific details. In some instances, well-known structures and components are shown in block diagram form in order to avoid obscuring the concepts of the subject technology.

Aspects of the subject disclosure provide system software and methods for presenting and controlling the appearance of one or more windows in a graphical user interface (GUI). In certain aspects, methods of the subject disclosure can be used to affect the sizing and placement of one or more windows, for example, within a desktop display area of a graphical user interface.

In certain aspects, methods of the subject disclosure provide a grid within a GUI for use in facilitating placement and/or size adjustments to one or more displayed windows. For example, the subject technology comprises a window manager that includes a grid for use in positioning and/or snapping one or more displayed windows to a fixed location within a desktop display area. One or more edges of a window that is moved or resized by the user can be matched up with contours of the grid. For example, the edges of a resized window can be aligned with grid contours that may (or may not) be visible to the user. Depending on the size and spacing of the grid contours, a user may have a greater number, or a fewer number, of resizing options. In some implementations, when the user moves (or resizes) a window, the edges of the window will be snapped to the closest corresponding grid contours.

In some implementations, a window can be snapped to a particular location on the grid based on a determination that the particular location is more desirable than other grid locations. The determination that the window should be snapped to a particular location (e.g., to match up with particular grid contours) can take into consideration several factors. For example, a determination of optimal window size/location can be based on total screen size, a number of windows that are displayed, window dimensions, window launch order, information content displayed in the window, user preferences and settings, etc.

Furthermore, in some implementations, resistance can be provided to movement of a window at certain grid locations, for example, the window can be made to "stick" to the grid at certain locations, depending on various conditions. By way of example, a window may stick to the grid at a location corresponding to the edge of the screen, to prevent the content area of the window from being placed off-screen. Similarly, a window may stick to a grid location determined to be in a correct or optimal location, such as a grid location aligning with the edge of one or more other windows (e.g., to prevent overlap among windows), or a grid location that would place the window in an empty space within the desktop display area, for example, to prevent occluding one or more windows by guiding the moving window into an open area.

Figure 1:
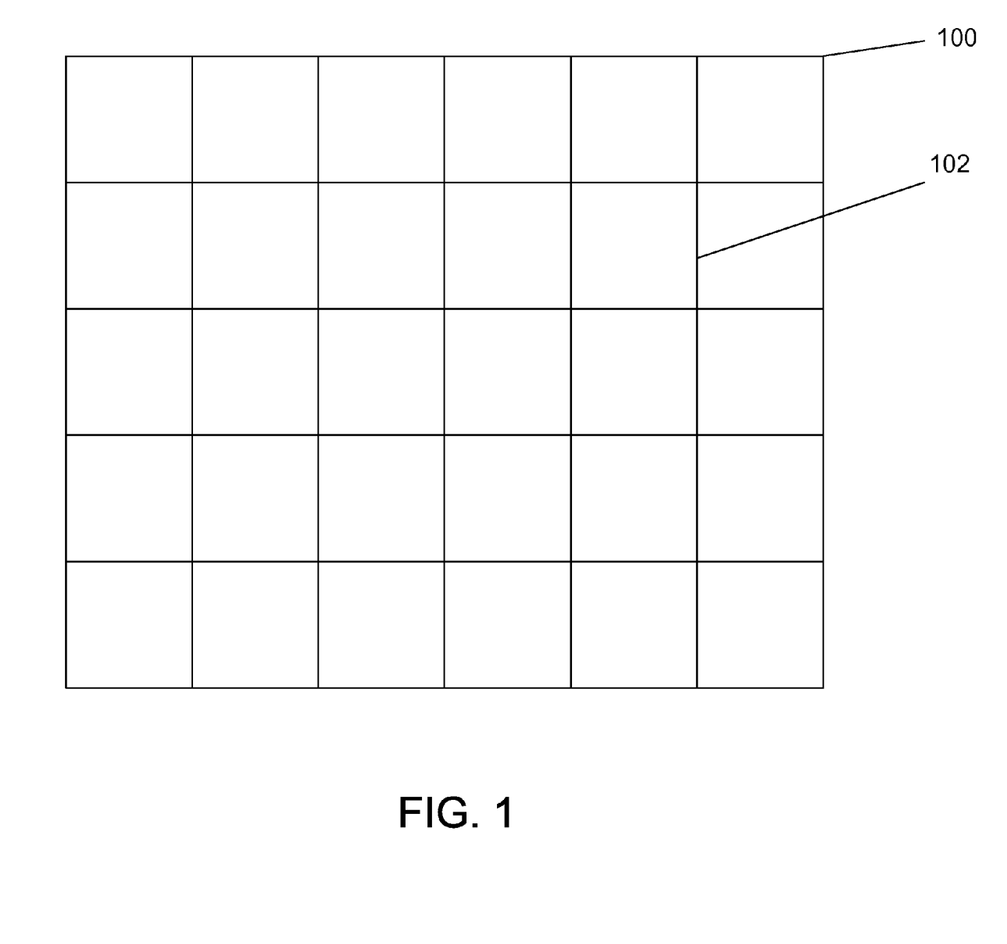
FIG. 1 illustrates an example of a grid within a desktop display area, according to some aspects of the subject disclosure.

FIG. 1 illustrates an example of a grid 102 within a desktop display area 100. Although the desktop display area 100 can comprise any portion of area displayed by a graphical user interface (GUI), in certain aspects the desktop display area 100 will comprise the entire displayed area of the GUI (e.g., the desktop of the GUI). The grid 102 can also cover any portion of the desktop display area 100. In the illustration of FIG. 1, the grid 102 is illustrated as covering the entire desktop display area 100. The grid 102 is comprised of regularly spaced grid contour lines, however, in other aspects the spacing of the grid contour lines can vary, for example, as a function of location in the desktop display area 100.

Figure 2:
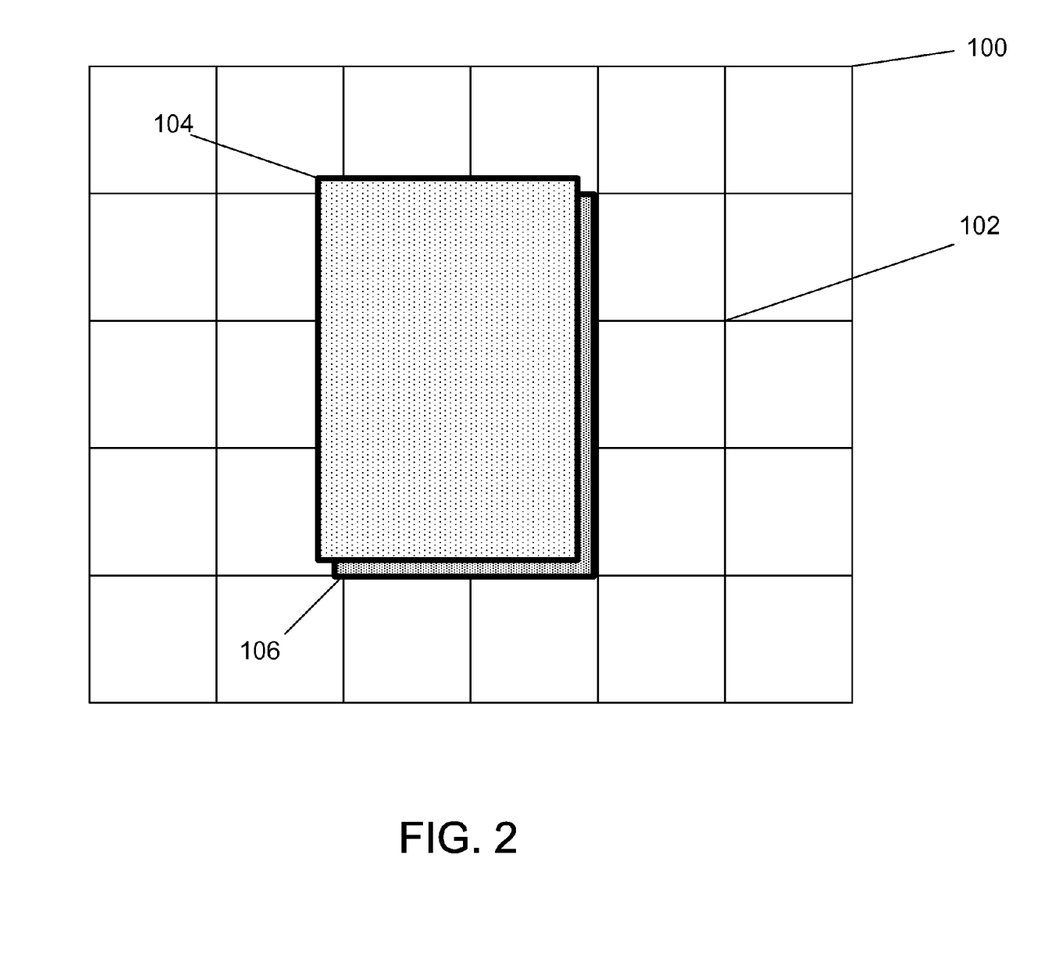
FIG. 2 illustrates an example of the placement of a window in a new position with respect to the grid depicted in FIG. 1, according to some aspects of the disclosure.

FIG. 2 illustrates an example of the placement of a window into a new position with respect to the grid of FIG. 1. Specifically, FIG. 2 further illustrates a window at a first position 104 that is adjusted to a second position 106. Although the illustration of FIG. 2 depicts the window 104 being moved, any adjustment can be performed to the window 104 (e.g., due to resizing, opening of a new window, etc.) that could require a movement (or new placement) of the window 104 onto the grid 102.

Figure 3A:
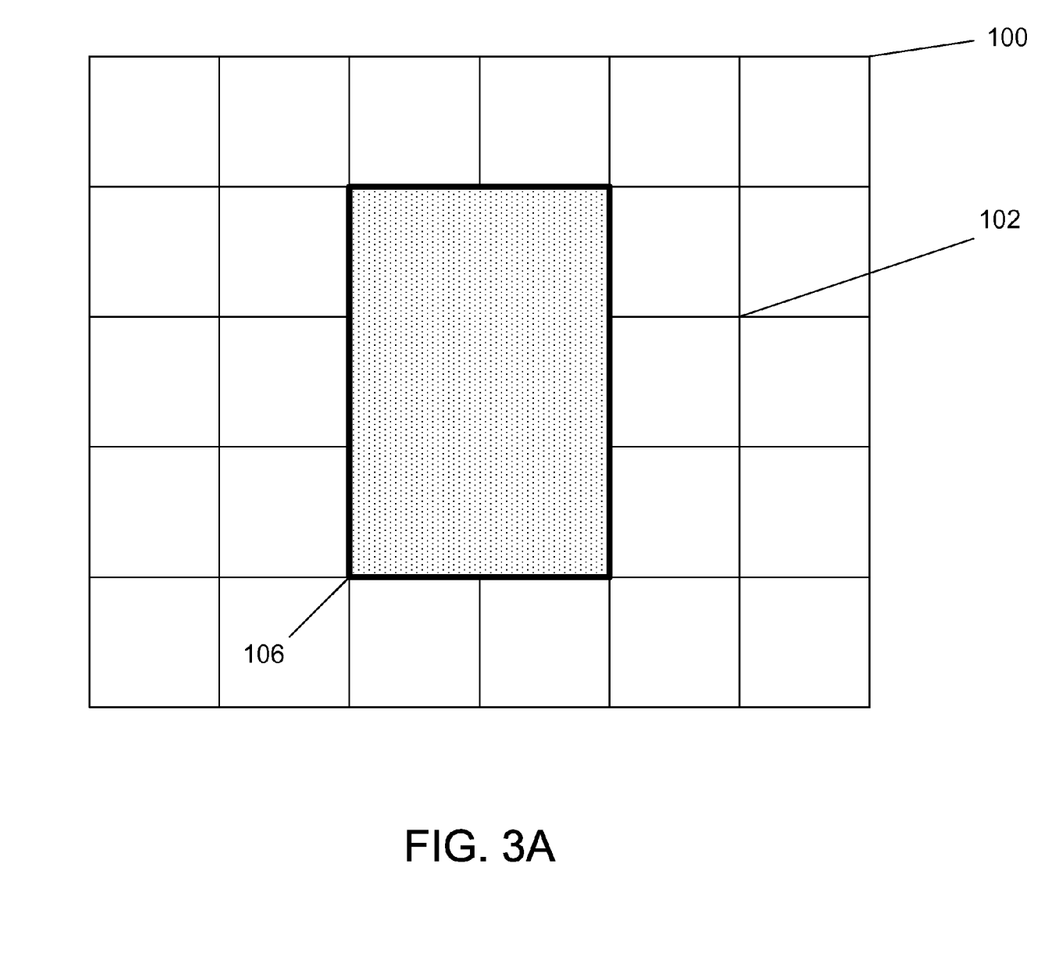
FIG. 3A illustrates an example of a window being snapped to a new position, according to some aspects of the disclosure.

FIG. 3A illustrates an example of a window (e.g., at the second position 106) being snapped to the grid 100. As illustrated, the window in the second position is snapped to the grid 100 corresponding with contour lines of the grid 102. Specifically, the edges of the window at the second position 106 are snapped to align with the contours of the grid 102. Depending on the desired implementation, there can be any number of positions for the placement/resizing of the window, depending on the number of grid contour lines.

In practice, by automatically snapping the window to a position on the grid 102, the placement or sizing of the window can be accomplished more quickly and conveniently. For example, automatic snapping of the window to particular locations on the desktop display area 100 (e.g., onto the contour lines of the grid 102) can allow the user to more quickly and accurately reposition or resize a selected window.

In certain aspects, movement of one or more edges of a window (e.g., the window 104) over certain areas of the grid 102 (e.g., over various grid contours) may require varying amounts of resistance. For example, a user may be required to provide stronger indications that he/she wishes to move the edges of a window across certain predetermined locations on the grid 102, before the window manager will permit movement of the window across the predetermined locations.

By way of example, it may be uncommon that a user would purposefully position a window outside of the desktop display area 100. As such, the contour lines of the grid 102 around the border of the desktop display area 100 can provide a greater resistance before allowing the edges of the window to pass over them and into off-screen portions of the desktop display area 100. By providing greater resistance along grid contours around the border of the desktop display area 100, the user can quickly and easily snap a window to the edge of the desktop display area 100, without the need to carefully align the window's edge with the edge of the desktop display area 100 in order to avoid un-intentionally positioning the window off-screen.

In some implementations, varying amounts of resistance may be provided along different portions of the grid 102 in order to allow a user to more conveniently place or resize a window at a particular location on the grid 102. By way of example, a user may wish to resize a window displaying video content to a larger size, while preserving a particular aspect ratio. Accordingly, a greater amount of resistance may be provided at regions of the grid 102 along grid contours corresponding to the desired contrast ratio.

In another example, a user may wish to quickly move a selected window to a portion of the desktop display area 100 that is not obfuscated by other windows. Accordingly, grid contour lines in empty spaces of the desktop display area 100 may provide a greater affinity for the borders of the selected window so that the user can more quickly and conveniently reposition the selected window.

In yet another example, a user may wish to align borders of two different windows such that the windows touch, but do not overlap. As such, the grid contour lines matching up with the edges of a stationary window may provide a greater resistance with respect to the edges of a moving window, such that the edges of the moving window can be easily aligned with that of the stationary window, without occluding the stationary window.

Figure 3B:
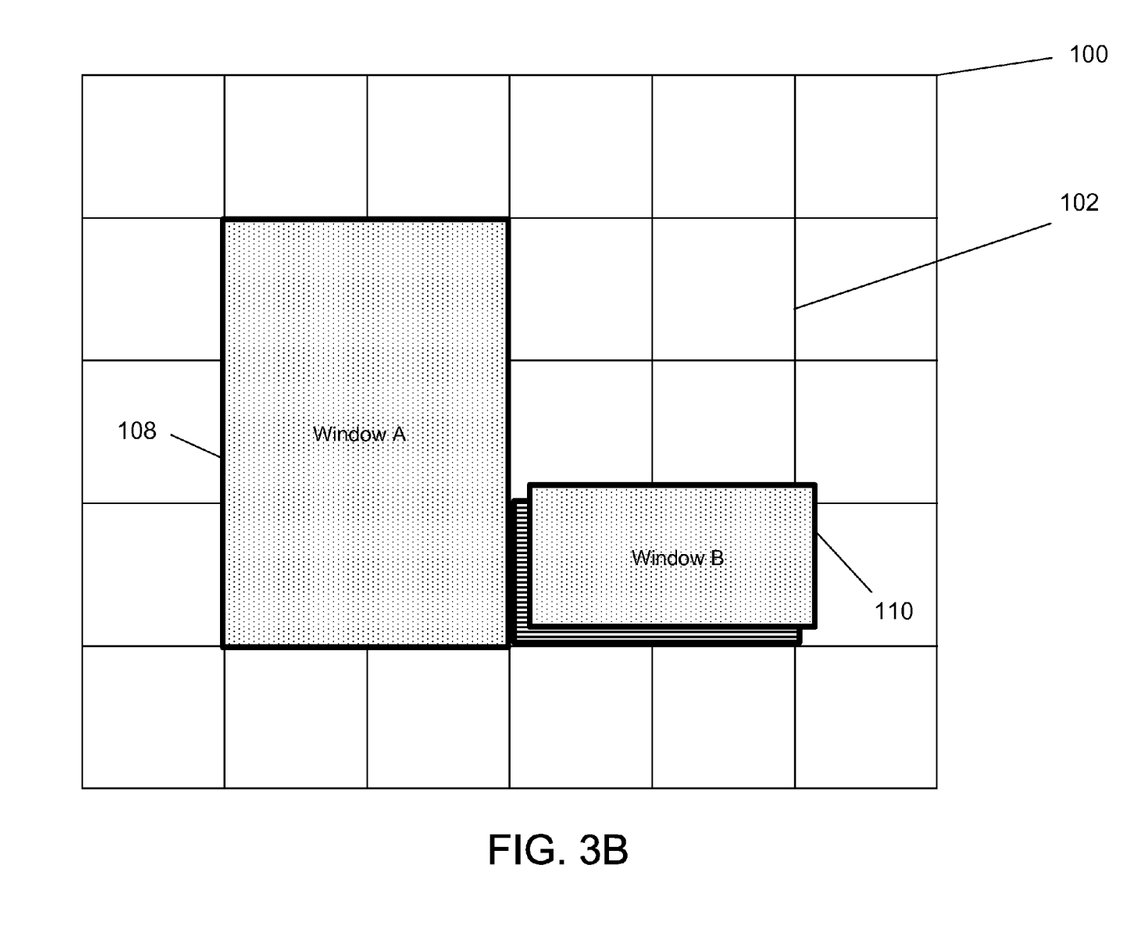
FIG. 3B illustrates an example of the snapping of two windows along an adjoining border, according to some aspects of the disclosure.

FIG. 3B illustrates an example of the snapping of two windows along an adjoining border. In the example illustrated in FIG. 3B, Window A 108 has been snapped to the grid 102 in desktop display area 100. Window B 110 is repositioned, however, as indicated by the shadow of Window B 110, the left-most border of Window B 110 has an affinity for alignment with the right-most border of Window A 108. As such, as a user repositions Window B 110, by providing a greater resistance/affinity along the Window A 108/Window B 110 border, the grid contour lines will enable the user to more easily snap Window B 110 to the grid, without overlapping the desktop display area occupied by Window A 108.

Figure 4:
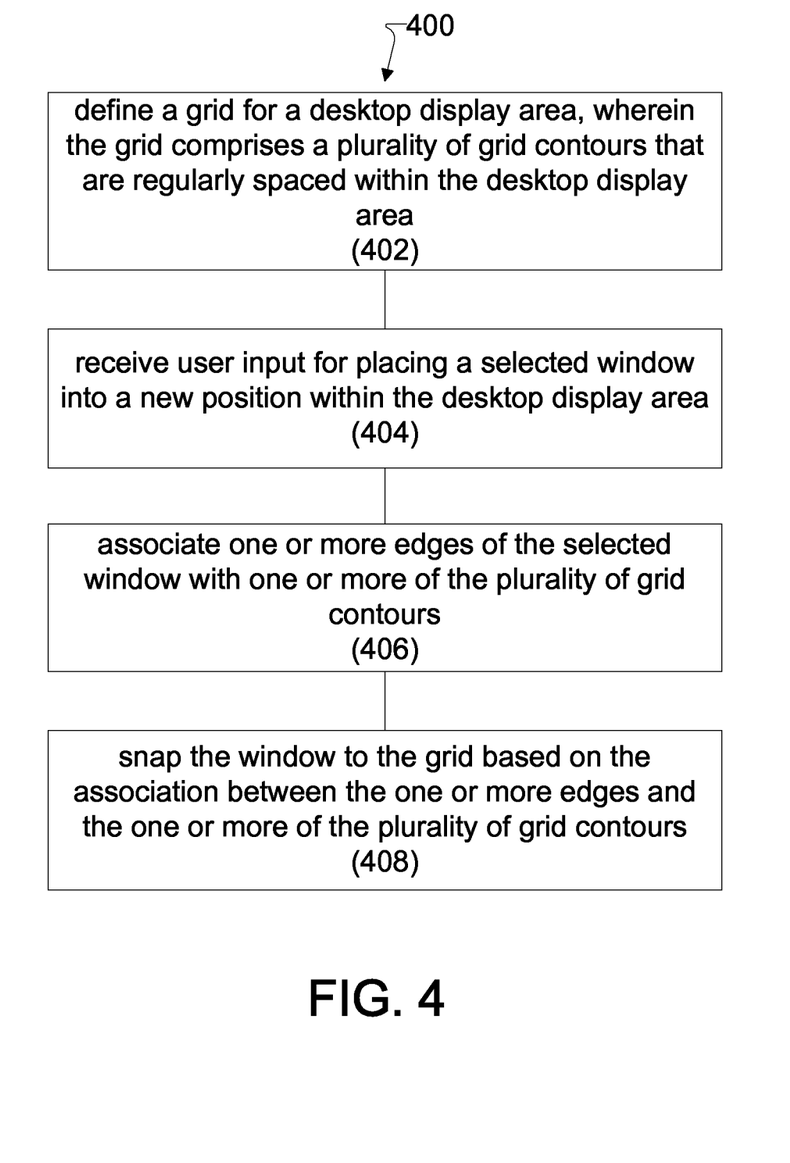
FIG. 4 illustrates an example of steps of a method for managing the placement one or more windows, according to some aspects of the disclosure.

FIG. 4 illustrates an example of a method 400 for snapping a window to a grid. The method 400 begins with step 402 in which a grid is defined in a desktop display area, wherein the grid comprises a plurality of grid contours that are regularly spaced within the desktop display area. As indicated above, the grid can cover any portion of the desktop display area, and in some instances, extend into a portion of the display area that is not viewable by the user, for example, an off-screen portion of the display area. Furthermore, the grid contours may (or may not) be evenly spaced over the desktop display area. For example, a greater number of grid contour lines can exist in portions of the desktop display area where a finer granularity of window placement may be desired.

In step 404, user input for placing a selected window into a new position within the desktop display area is received. The input can comprise any type of user command or indication that will cause an existing window to change relative location on the grid and/or to cause the creation of a new window on the grid. By way of example, the user input can comprise a command to move, resize or open a window.

In step 406, one or more edges of the selected window are associated with one or more of the plurality of grid contours. The association of window edges with grid contours can be performed using any information about one or more windows that are running/being displayed and/or any information available about the user.

In some implementations, the association of one or more of the grid contours and one or more edges of the window will be based on a distance between the one or more grid contours and the one or more edges of the window. For example, a window being moved or resized may be simply snapped to a location in the desktop display area that corresponds with the closest proximate grid contours.

In another implementation, the association between one or more edges of the window and one or more of the grid contours will be based on a determined affinity between the one or more edges of the window and the one or more grid contours. The affinity can be based on any information pertaining to the user, the window and/or the content displayed therein. Furthermore, based on the affinity determined between the one or more edges of the window and the one or more grid contours, resistance can be provided to guide the window to make the window snap-to or "stick" at locations wherein a high affinity is determined.

By way of example, the user may wish to align an edge of the window with another displayed object (e.g., another window). As such, it may be determined that there is a high affinity between an edge of the window and a contour line of the grid corresponding to an edge of the other window. In response, a resistance can be increased between the edge of the window and the corresponding contour line, such that the window is more likely to "stick" at its determined optimal location.

In step 408, the window is snapped to the grid based on the association between the one or more edges and the one or more of the plurality of grid contours. The snapping of the window to the grid comprises fixing the edges of the window to the grid at locations corresponding to contour lines of the grid.

In another aspect, a window manager of the subject technology is configured to resize or "tile" a window, in response to specific inputs and gestures received from a user. In one implementation, a selected window can be resized based on the direction of a gesture performed by the user. For example, if a user selects a particular window and moves the window toward a edge of a desktop display area (e.g., the screen area) the window can be sized to a first size (e.g., 50%); as the user continues to apply pressure and/or gestures etc. (e.g., by continuing to move the window toward the edge), the window can be retiled, e.g., increased to 60%, 70%, 80%, etc. Furthermore, the retiling of a particular window may cause other displayed windows to shift so that none of the windows occlude one another.

Figure 5A:
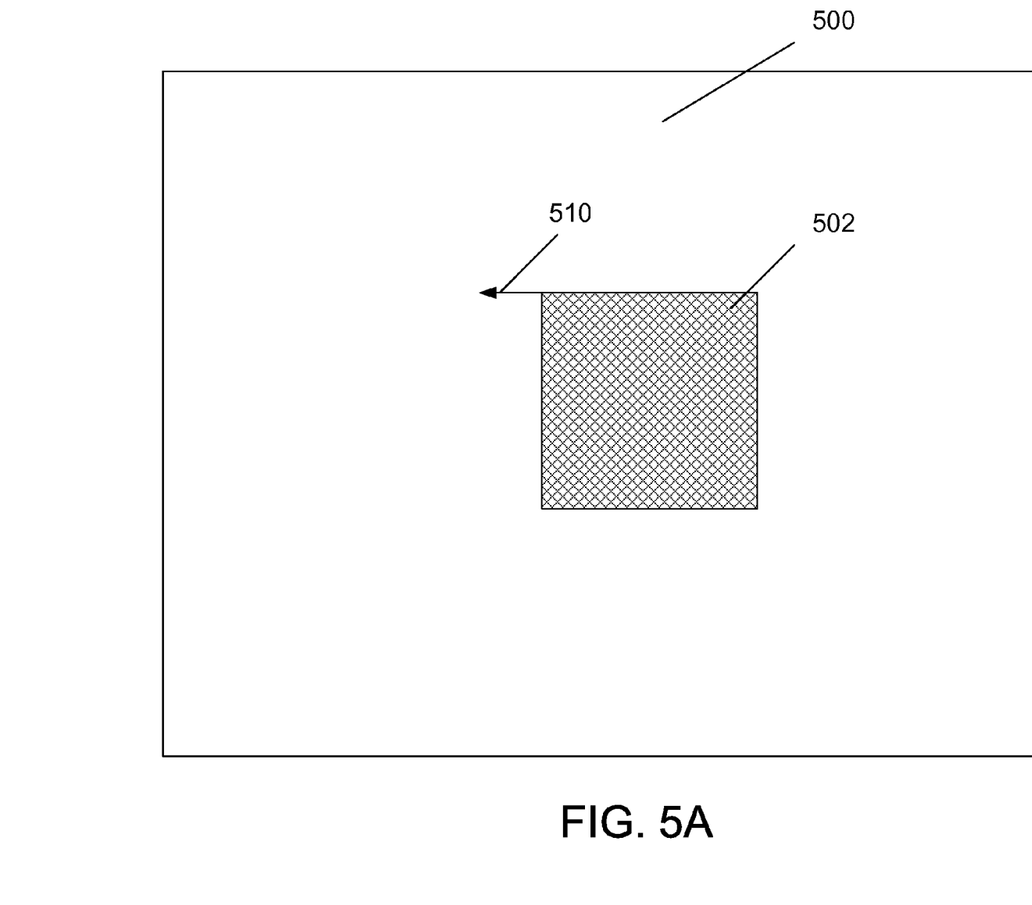
FIG. 5A illustrates an example of a selection of a window for tiling, according to some aspects of the disclosure.

FIG. 5A illustrates an example of a selection of a window for tiling. Specifically, FIG. 5A includes a desktop display area 500, a window of a first size 502 and an indicator of a user selection and a first gesture 510, made with respect to the window 502. In certain aspects, a user can select the window 502 (e.g., using an input device such as a touch pad or pointing device) and can then provide an addition input (e.g., a gesture) to indicate that the window should be tiled to a new size. Any type of additional input (such as the first gesture 510), may be received from the user and used to tile the window 502.

Figure 5B:
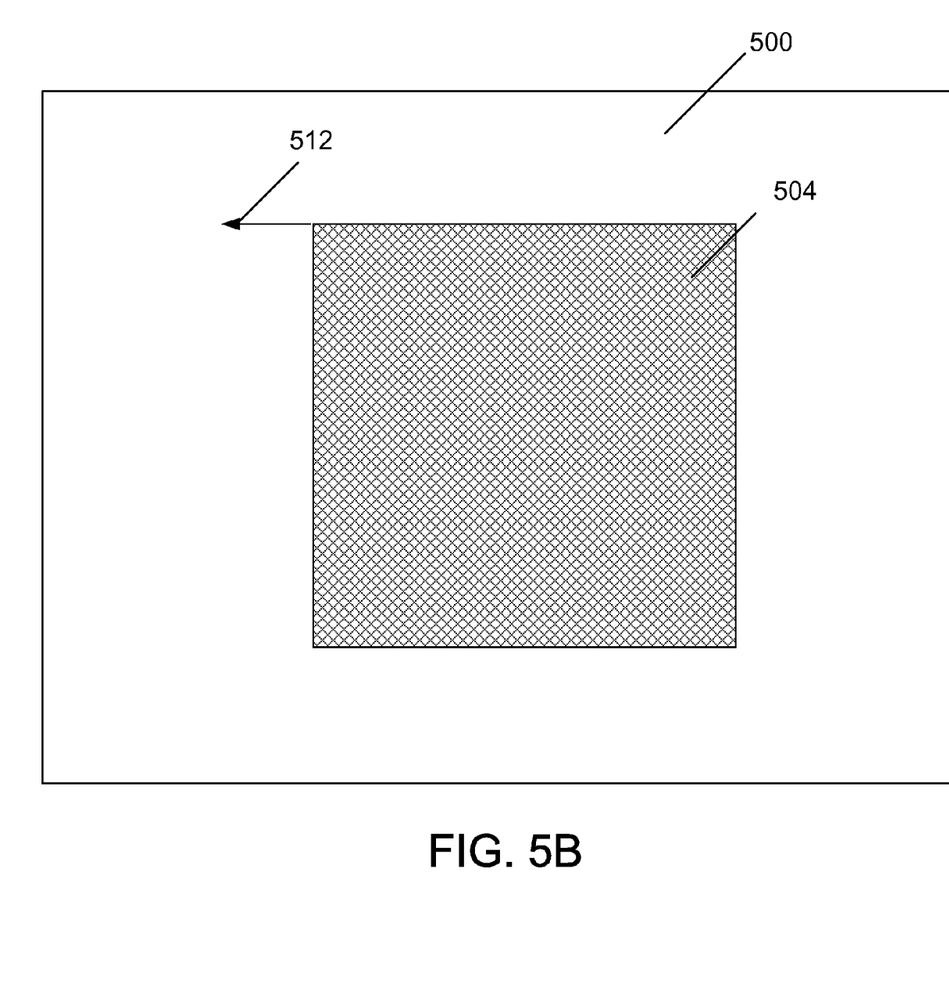
FIG. 5B illustrates an example of a second user input for tiling the window selected in FIG. 5A, according to some aspects of the disclosure.

By way of example, the user can select the window 502 and gesture to the left direction (with respect to the desktop display area 500), as depicted in FIG. 5A FIG. 5B illustrates an example of a result from the user input received in the example of FIG. 5A. In FIG. 5B, the window is of a second size 504. The size to which the window is tiled (or re-tiled) in response to a particular user input can be fixed, or can be configured by the user. In certain aspects, re-tiling of the window can be performed to coincide with contour lines of a grid (not shown) that are defined within the desktop display area 500.

In the example illustrated in FIG. 5B, the user has selected the window of the second size 504 and provided a second gesture 512, for example, by moving the window of the second size 504 in a left direction with respect to the desktop display area 500.

Figure 5C:
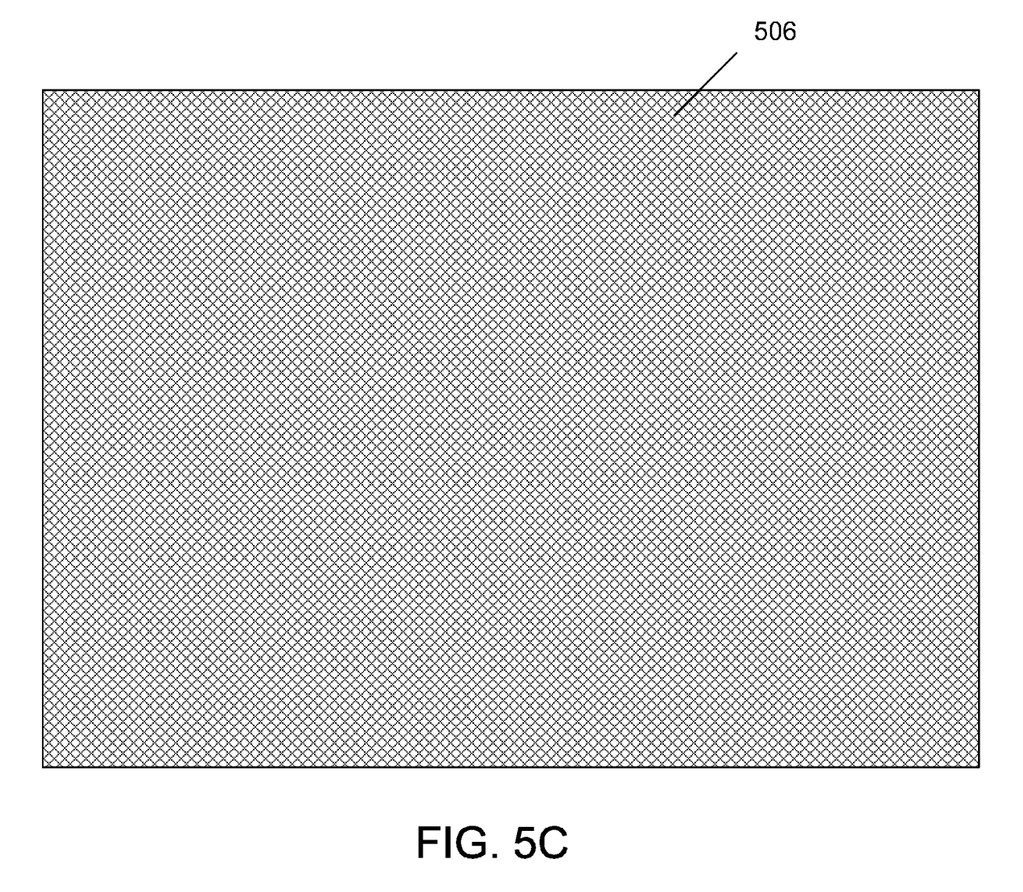
FIG. 5C illustrates an example of a third user input for tiling the window selected in FIG. 5A, according to some aspects of the disclosure.

FIG. 5C illustrates an example of a result from the user input received in the example of FIG. 5B. Specifically, FIG. 5C illustrates a window of a third size 506 that has been maximized to cover the desktop display area 500.

Figure 6:
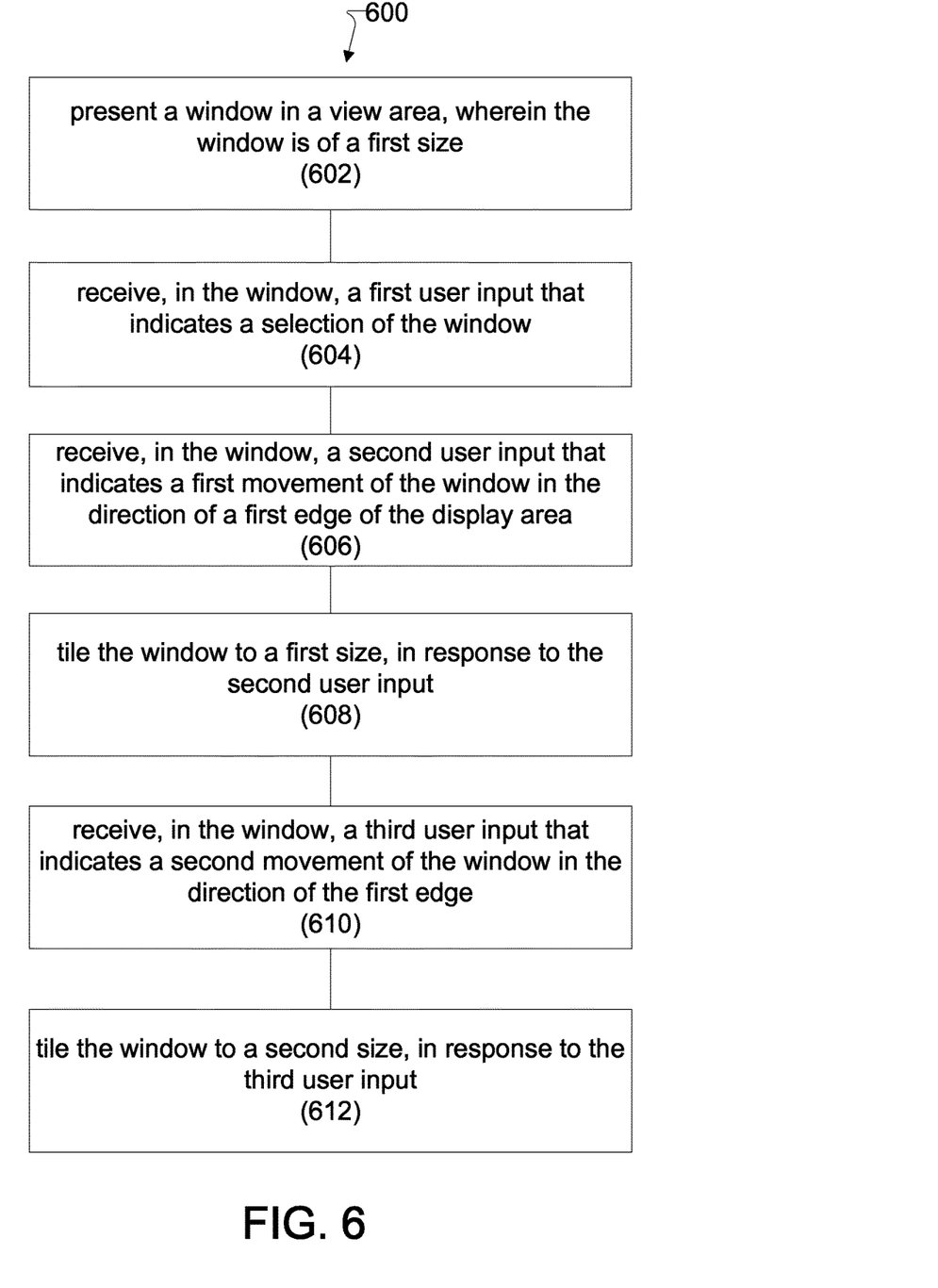
FIG. 6 illustrates an example of steps of a method for tiling one or more windows, according to some aspects of the disclosure.

FIG. 6 illustrates steps of an example method 600 for tiling one or more windows. The method 600 begins with step 602, in which a window of a first size is presented in a desktop display area. The presentation of the window of the first size can occur as the result of any command or process that can cause the window to display in a desktop display area of a GUI. For example, the window can be presented in response to the user opening a new application or application window. Alternatively, the window may correspond to a running process or application that is selected by the user (e.g., maximized or selected for display).

In step 604, a first user input is received in the window that indicates a selection of the window. The first user input can be received via any input means available to the user. By way of example, the first user input can be received via a touch pad, a pointing device, stylus or via a touch-based display, etc. By way of example, the first user input may be received in the first window when the user selects the first window (e.g., using a pointing device).

In step 606, a second user input is received, in the window, indicating a first movement of the window in the direction of a first edge of the desktop display area. Although the second user input can comprise any user gesture or indication that the user wishes to tile/re-tile the window, in some examples, the second user input comprises a motion to drag the selected window toward a particular edge of the desktop display area (e.g., toward the left edge).

In step 608, the window is tiled to a first size, in response to the second user input received in step 606. The tiling of the window to the first size can comprise tiling the first window to a predetermined size. For example, the first window may be tiled to a predetermined percentage of the maximum window size. Furthermore, as discussed above, the tiling/re-tiling of the window can be performed such that one or more edges of the window correspond with one or more contours of a grid (e.g., a grid defined within the desktop display area), such that as the window is retiled, the window is "snapped" to the grid.

In step 610, a third user input is received in the first window indicating a second movement of the window in the direction of the first edge. As with the second input received in step 606, the third user input can comprise any user gesture or indication that the user wishes to tile/re-tile the window. For example, the third user input can comprise a repeated gesture by the user to drag the selected window toward the left edge of the desktop display area.

In step 612, the first window is tiled/re-tiled to a second size, in response to the third user input. As in step 608, the first window may be tiled to a second predetermined percentage of the maximum window size. Furthermore, the tiling/re-tiling of the window can be performed such that one or more edges of the window correspond with one or more contours of a grid (e.g., a grid defined within the desktop display area), such that when the window is retiled, the window is "snapped" to the grid.

Figure 7:
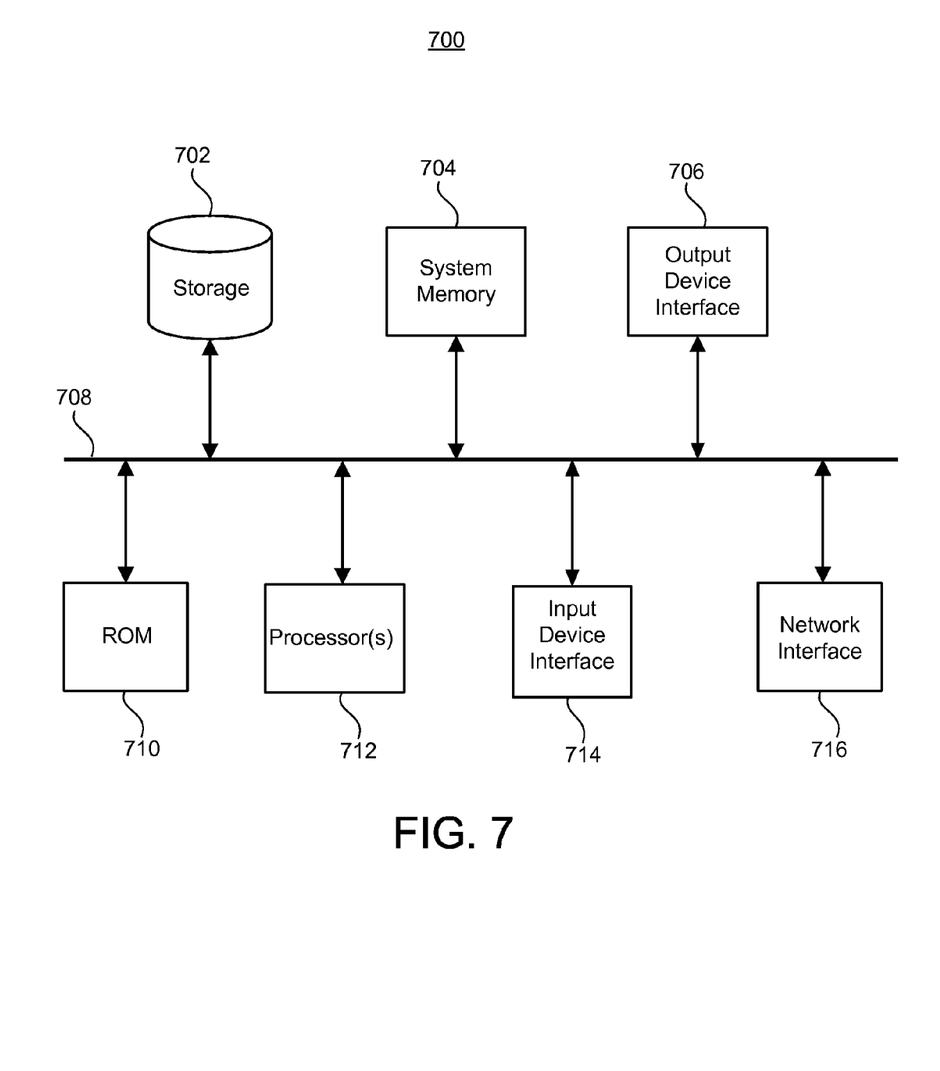
FIG. 7 illustrates an example of an electronic system that can be used to implement some aspects of the subject disclosure.

FIG. 7 illustrates an example of an electronic system that can be used for executing the steps of the subject disclosure. In some examples, the electronic system 700 can be a single computing device such as a server. Furthermore, in some implementations, the electronic system 700 can be operated alone or together with one or more other electronic systems e.g., as part of a cluster or a network of computers.

As illustrated, the electronic system 700 comprises storage 702, a system memory 704, an output device interface 706, system bus 708, ROM 710, one or more processor(s) 712, input device interface 714 and a network interface 716. In some aspects, the system bus 708 collectively represents all system, peripheral, and chipset buses that communicatively connect the numerous internal devices of the electronic system 700. For instance, system bus 708 communicatively connects the processor(s) 712 with the ROM 710, the system memory 704, the output device interface 706 and the permanent storage device 702.

In some implementations, the various memory units, the processor(s) 712 retrieve instructions to execute (and data to process) in order to execute the steps of the subject technology. The processor(s) 712 can be a single processor or a multi-core processor in different implementations. Additionally, the processor(s) can comprise one or more graphics processing units (GPUs) and/or one or more decoders, depending on implementation.

The ROM 710 stores static data and instructions that are needed by the processor(s) 712 and other modules of the electronic system 700. Similarly, the processor(s) 712 can comprise one or more memory locations such as a CPU cache or processor in memory (PIM), etc. The storage device 702, is a read-and-write memory device. In some aspects, this device can be a non-volatile memory unit that stores instructions and data even when the electronic system 700 is without power. Some implementations of the subject disclosure can use a mass-storage device (such as solid state, magnetic or optical storage devices) e.g., a permanent storage device 702.

Other implementations can use one or more a removable storage devices (e.g., magnetic or solid state drives) such as permanent storage device 702. Although the system memory can be either volatile or non-volatile, in some examples the system memory 704 is a volatile read-and-write memory, such as a random access memory. System memory 704 can store some of the instructions and data that the processor needs at runtime.

In some implementations, the processes of the subject disclosure are stored in system memory 704, permanent storage device 702, ROM 710 and/or one or more memory locations embedded with the processor(s) 712. From these various memory units, processor(s) 712 retrieve instructions to execute and data to process in order to execute the processes of some implementations of the instant disclosure.

The bus 708 also connects to the input device interface 714 and output device interface 706. The input device interface 514 enables a user to communicate information and select commands to the electronic system 700. Input devices used with the input device interface 714 may include for example, alphanumeric keyboards and pointing devices (also called "cursor control devices") and/or wireless devices such as wireless keyboards, wireless pointing devices, etc.

Finally, as shown in FIG. 7, bus 708 also communicatively couples the electronic system 700 to a network (not shown) through a network interface 716. It should be understood that the network interface 716 can be either wired, optical or wireless and may comprise one or more antennas and transceivers. In this manner, the electronic system 700 can be a part of a network of computers, such as a local area network ("LAN"), a wide area network ("WAN"), or a network of networks, such as the Internet.

In practice, the methods of the subject technology can be carried out by the electronic system 700. In some aspects, instructions for performing one or more of the method steps of the present disclosure will be stored on one or more memory devices such as the storage 702 and/or the system memory 704.

In this specification, the term "software" is meant to include firmware residing in read-only memory or applications stored in magnetic storage, which can be read into memory for processing by a processor. Also, in some implementations, multiple software aspects of the subject disclosure can be implemented as sub-parts of a larger program while remaining distinct software aspects of the subject disclosure. In some implementations, multiple software aspects can also be implemented as separate programs. Finally, any combination of separate programs that together implement a software aspect described here is within the scope of the subject disclosure. In some implementations, the software programs, when installed to operate on one or more electronic systems, define one or more specific machine implementations that execute and perform the operations of the software programs.

A computer program (also known as a program, software, software application, script, or code) can be written in any form of programming language, including compiled or interpreted languages, declarative or procedural languages, and it can be deployed in any form, including as a stand alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

It is understood that any specific order or hierarchy of steps in the processes disclosed is an illustration of example approaches. Based upon design preferences, it is understood that the specific order or hierarchy of steps in the processes may be rearranged, or that all illustrated steps be performed. Some of the steps may be performed simultaneously. For example, in certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

A phrase such as an "aspect" does not imply that such aspect is essential to the subject technology or that such aspect applies to all configurations of the subject technology. A disclosure relating to an aspect may apply to all configurations, or one or more configurations. A phrase such as an aspect may refer to one or more aspects and vice versa. A phrase such as a "configuration" does not imply that such configuration is essential to the subject technology or that such configuration applies to all configurations of the subject technology. A disclosure relating to a configuration may apply to all configurations, or one or more configurations. A phrase such as a configuration may refer to one or more configurations and vice versa.

All structural and functional equivalents to the elements of the various aspects described throughout this disclosure that are known or later come to be known to those of ordinary skill in the art are expressly incorporated herein by reference and are intended to be encompassed by the claims.

What is claimed is:

1. A computer-implemented method for tiling a window, the method comprising:
   presenting a window of a first size, in a desktop display area, wherein a first edge of the window is aligned with a grid comprising a set of contour lines within the desktop display area;
   receiving, in the window, a first user input indicating a selection of the window;
   receiving, in the window, a second user input indicating a first movement of the window in a direction of a first edge of the desktop display area;
   in response to the second user input, tiling the window to a first predetermined percentage of a maximum window size and snapping the window to the grid centered both vertically and horizontally in the desktop display area;
   receiving, in the window, a subsequent third user input indicating a second movement of the window in the direction of the first edge, wherein each of the second user input and the third user input comprises a single linear motion of an input source; and
   in response to the third user input, tiling the window to a second predetermined percentage of the maximum window size and snapping the window to the grid centered both vertically and horizontally in the desktop display area,
   wherein the tiling and snapping of the window in response to the second and third user inputs are not dependent on a drop position of the window in the desktop display area.

2. The method of claim 1, further comprising:
   receiving, in the window, a fourth user input indicating a third movement of the window in the direction of the first edge of the desktop display area; and
   in response to the fourth user input, tiling the window to a third predetermined percentage of the maximum window size, wherein the window is snapped to the grid.

3. The method of claim 1, wherein spacing of contour lines of the grid vary based on location on the desktop display area.

4. The method of claim 1, wherein contour lines of the grid are regularly spaced on the desktop display area.

5. The method of claim 1, wherein the grid consists of a plurality of grid contours that are spaced within the desktop display area and further comprising:
   associating one or more edges of the window with one or more of the plurality of grid contours; and
   snapping the window to the grid based on the association between the one or more edges and the one or more of the plurality of grid contours.

6. The method of claim 5, wherein associating one or more edges of the window with one or more of the plurality of grid contours further comprises:
   determining an affinity between the one or more edges of the window and the one or more of the plurality of grid contours; and
   providing a resistance to align the one or more edges of the window with the one or more of the plurality of grid contours based on the affinity.

7. The method of claim 5, wherein associating the one or more edges of the selected window further comprises:
   determining a preferred location for the window; and
   selecting the one or more of the plurality of grid contours for association with the one or more edges of the window based on the preferred location.

8. The method of claim 5, wherein associating the one or more edges of the selected window further comprises:
   selecting the one or more of the plurality of grid contours for association with the one or more edges of the window based on a distance between the one or more of the plurality of grid contours and the one or more edges of the window.

9. A system for tiling a window, the system comprising:
   one or more processors; and
   a computer-readable medium comprising instructions stored therein, which when executed by the processors, cause the processors to perform operations comprising:
     presenting a window of a first size, in a desktop display area, wherein a first edge of the window is aligned with a grid comprising a set of contour lines within the desktop display area;
     receiving, in the window, a first user input indicating a selection of the window;
     receiving, in the window, a second user input indicating a first movement of the window in a direction of a first edge of the desktop display area, wherein the second user input comprises a linear motion to drag the window toward an edge of the desktop display area;
     in response to the second user input, tiling the window to a first predetermined percentage of a maximum window size and snapping the window to the grid, centering the window both vertically and horizontally in the desktop display area;
     receiving, in the window, a subsequent third user input indicating a second movement of the window in the direction of the first edge, wherein each of the second user input and the third user input comprises a single linear motion of an input source; and
     in response to the third user input, tiling the window to a second predetermined percentage of the maximum window size and snapping the window to the grid centered both vertically and horizontally in the desktop display area,
     wherein the tiling and snapping of the window in response to the second and third user inputs are not dependent on a drop position of the window in the desktop display area.

10. The system of claim 9, further comprising:
    receiving, in the window, a fourth user input indicating a third movement of the window in the direction of the first edge; and
    in response to the fourth user input, tiling the first window to a third predetermined percentage of the maximum window size, wherein the window is snapped to the grid.

11. The system of claim 9, wherein spacing of contour lines of the grid are varied based on location on the desktop display area.

12. The system of claim 9, wherein contour lines of the grid are regularly spaced on the desktop display area.

13. The system of claim 9, wherein the grid consists of a plurality of grid contours that are spaced within the desktop display area and further comprising:
  associating one or more edges of the window with one or more of the plurality of grid contours; and
  snapping the window to the grid based on the association between the one or more edges and the one or more of the plurality of grid contours.

14. The system of claim 13, wherein the associating one or more edges of the window with one or more of the plurality of grid contours comprises:
  determining an affinity between the one or more edges of the window and the one or more of the plurality of grid contours; and
  providing a resistance to align the one or more edges of the window with the one or more of the plurality of grid contours based on the affinity.

15. The system of claim 13, wherein the associating the one or more edges of the selected window comprises one of:
  determining a preferred location for the window and selecting the one or more of the plurality of grid contours for association with the one or more edges of the window based on the preferred location; and
  selecting the one or more of the plurality of grid contours for association with the one or more edges of the window based on a distance between the one or more of the plurality of grid contours and the one or more edges of the window.

16. A non-transitory computer-readable medium comprising instructions stored thereon, which when executed by a processor, cause the processor to perform operations comprising:
  presenting a window of a first size, in a desktop display area, wherein a first edge of the window is aligned with a grid comprising a set of contour lines within the desktop display area;
  receiving, in the window, a first user input indicating a selection of the window;
  receiving, in the window, a second user input indicating a first movement of the window in a direction of a first edge of the desktop display area, wherein the second user input comprises a linear motion to drag the window toward an edge of the desktop display area;
  in response to the second user input, tiling the window to a first predetermined percentage of a maximum window size and snapping the window to the grid, centering the window both vertically and horizontally in the desktop display area;
  receiving, in the window, a subsequent third user input indicating a second movement of the window in the direction of the first edge, wherein each of the second user input and the third user input comprises a single linear motion of an input source; and
  in response to the third user input, tiling the window to a second predetermined percentage of the maximum window size and snapping the window to the grid centered both vertically and horizontally in the desktop display area,
  wherein the tiling and snapping of the window in response to the second and third user inputs are not dependent on a drop position of the window in the desktop display area.

17. The non-transitory computer-readable medium of claim 16, wherein spacing of contour lines of the grid are one of varied based on location on the desktop display area and regularly spaced on the desktop display area.

18. The non-transitory computer-readable medium of claim 16, wherein the grid consists of a plurality of grid contours that are spaced within the desktop display area and further comprising:
  associating one or more edges of the window with one or more of the plurality of grid contours; and
  snapping the window to the grid based on the association between the one or more edges and the one or more of the plurality of grid contours.

19. The non-transitory computer-readable medium of claim 16, wherein the associating one or more edges of the window with one or more of the plurality of grid contours comprises one of:
  determining an affinity between the one or more edges of the window and the one or more of the plurality of grid contours and providing a resistance to align the one or more edges of the window with the one or more of the plurality of grid contours based on the affinity; and
  determining a preferred location for the window and selecting the one or more of the plurality of grid contours for association with the one or more edges of the window based on the preferred location and selecting the one or more of the plurality of grid contours for association with the one or more edges of the window based on a distance between the one or more of the plurality of grid contours and the one or more edges of the window.

* * * * *